United States Patent Office 2,830,062
Patented Apr. 8, 1958

2,830,062
METHOD OF PREPARING ANTHRAQUINONE DYES

Frank Lodge, Manchester, England, assignor to Imperial Chemical Industries Limited, London, England, a corporation of Great Britain No Drawing. Application October 22, 1956
Serial No. 617,286

Claims priority, application Great Britain
October 28, 1955

5 Claims. (Cl. 260—380)

This invention relates to new dyestuff compositions, and more especially it relates to new anthraquinone dyestuff compositions having high resistance to fading by the combustion products of coal gas and also having good affinity for cellulose esters and good affinity for super-polyesters.

It is known that 5-nitro-4-anilino-1:8-dihydroxyanthraquinone dyes cellulose acetate in pale blue shades having high resistance to fading by the combustion products of coal gas and having high light fastness and wet fastness.

It has previously been proposed to obtain dyestuffs of improved affinity for acetate rayon, and also of equal or better fastness properties, by the manufacture of 5-nitro-4-anilino-1:8-dihydroxyanthraquinones which contain certain substituents in the phenyl residue, for example, hydroxyethyl-, those substituents represented by —(OCH$_2$CH$_2$)$_n$OH where $n$ can be 1, 2, 3 or 4, and those substituents represented by —CH$_2$—O—(CH$_2$CH$_2$—O—)$_n$Z wherein Z stands for hydrogen or alkyl and $n$ stands for 1, 2, or 3. These dyestuffs of improved affinity are manufactured by processes in which suitable anthraquinone intermediates for example 4:5-dinitro-1:8-dihydroxyanthraquinone are condensed with anilines containing the said substituents. Thus these dyestuffs which are derived from expensive substituted anilines, are more costly to produce than the parent 5-nitro-4-anilino-1:8-hydroxyanthraquinone.

It has now been found that a simple treatment of a 5-nitro-4-anilino-1:8-dihydroxyanthraquinone with formaldehyde in sulphuric acid of about 80-85% strength by weight yields a dyestuff composition of much improved affinity for cellulose acetate without impairing the fastness properties.

According to the invention, therefore, there is provided a process for the manufacture of new anthraquinone dyestuff compositions which comprises reacting a 5-nitro-4-anilino-1:8-dihydroxyanthraquinone, in which the phenyl residue of the anilino group may be optionally substituted by alkoxy, alkyl or halogen but not by solubilising groups, with more than one molecular proportion of formaldehyde in a medium of sulphuric acid of strength 75% to 90% by weight at a temperature between 10° C. and 40° C.

In carrying out the process of the invention it is preferred to use a large molecular excess of formaldehyde, a convenient proportion being about 2 parts by weight of formaldehyde for each 3 parts by weight of the 5-nitro-4-anilino-1:8-dihydroxyanthraquinone. The formaldehyde may be added either as an aqueous solution but it is preferably added in the polymeric state as paraformaldehyde.

In practice it is preferred to carry out the reaction of the said process at about 20° C. to 30° C., and to use sulphuric acid of about 80% to 85% strength by weight as the reaction medium.

The affinity of the product obtained is dependent upon the time of reaction, there being an increase in affinity up to a maximum after a certain time, followed by a decrease in affinity if the reaction is carried further. The time of reaction required for maximum affinity varies with the temperature and with the strength of the sulphuric acid used as reaction medium; the time required is shorter when the temperature is raised and when the strength of the sulphuric acid is increased.

The product may conveniently be isolated by dilution of the reaction mixture, preferably by pouring it into a mixture of ice and water. The product is thereby precipitated and may be isolated by filtration and washing with water until free from acid, and if desired, may then be dried.

The new anthraquinone dyestuff compositions are preferably converted to a finely-divided aqueous dispersion before their use in the dyeing process. They may be dispersed by known procedures for example by milling the solid dyestuff or an aqueous paste thereof. The process of dispersion may optionally be assisted or hastened by adding to the dyestuff or dyestuff paste during milling a surface active agent, for example a non ionic dispersing agent such as a condensate of octyl cresol with ethylene oxide or an anionic dispersing agent such as sodium oleyl p-anisidine sulphonate.

The new anthraquinone dyestuff compositions of this invention have very good affinity for acetate rayon which they dye in blue shades which are fast to light and have a high resistance to the action of combustion products of coal gas. The new anthraquinone dyestuff compositions either singly or in the form of mixtures are also valuable for colouring aromatic polyester fibres and cellulose triacetate.

Thus the new anthraquinone dyestuff compositions may be dyed on aromatic polyester textile materials by the method described in British specification No. 609,943 using a swelling agent for the aromatic polyester as indicated in that specification, or using another dyeing "carrier" material for example diphenyl, or o- or p-phenylphenol. A like method may be used for the dyeing of cellulose triacetate textile materials.

Alternatively the aromatic polyester or the cellulose triacetate textile materials may be dyed in the absence of such a carrier, but the dyeing is then preferably carried out under super atmospheric pressure, at a temperature above 100° C., preferably at a temperature between 120° C. and 130° C.

The following examples, in which the parts and percentages are by weight, illustrate but do not limit the invention:

Example 1

40 parts of paraformaldehyde are added to 600 parts of 80% sulphuric acid and the mixture is stirred at 15° to 20° C. for 30 minutes. 60 parts of 5-nitro-4-anilino-1:8-dihydroxyanthraquinone are then added and the solution is allowed to stir at 20° to 30° C. for 16 hours.

The dystuff is isolated by pouring the solution into 3000 parts of ice and water, filtering off the blue suspension, washing the residue neutral to litmus with water and finally gravel-milling as a 5% paste with water and a little dispersing agent. The paste is then sieved to remove gravel when a blue liquor containing finely dispersed dyestuff is obtained. The dispersed dyestuff yields bright, intense blue shades on acetate rayon and polyester fibres having excellent fastness to light and burnt gas fumes.

Example 2

40 parts of paraformaldehyde are added to 600 parts of 85% sulphuric acid and the mixture is stirred at 15° to 20° C. for 30 minutes. 60 parts of 5-nitro-4-anilino-1:8-dihydroxyanthraquinone are added and the solution is allowed to stir at 20° to 25° C. for 4 hours before isolating the dystuff in ice water as described in Example 1. The dispersed dyestuff yields deep, fast blue shades on acetate rayon and polyester fibres.

If in the process of the above example there are used, in place of the 5-nitro-4-anilino-1:8-dihydroxyanthraquinone used therein, an equal weight of 5-nitro-4-(3'-methoxyanilino-)1:8-dihydroxyanthraquinone, or 5-nitro-4-(2'-methylanilino-)1:8-dihydroxyanthraquinone or 5-nitro-4-(3'-methylanilino-)1:8-dihydroxyanthraquinone, or 5-nitro - 4 - (3' - chloroanilino - )1:8 - dihydroxyanthraquinone, similar products are obtained having much greater affinity for cellulose acetate or triacetate or for aromatic polyesters than the respective anthraquinone compound used as starting material.

Example 3

A mixture of 151 parts of 100% sulphuric acid and 10.5 parts of water are stirred at a temperature of 20° C. to 25° C. and 26.5 parts of a 36.4% aqueous solution of formaldehyde is added. The mixture is stirred for 30 minutes and then 15 parts of 5-nitro-4-anilino-1:8-dihydroxyanthraquinone are added. The mixture is stirred at a temperature of 23° C. to 25° C. for 4 hours, then poured into 750 parts of a mixture of ice and water, the precipitated dyestuff is then filtered, washed and gravel-milled as described in Example 1. A similar product is obtained.

Example 4

The process described in Example 1 is repeated but using, in place of the 5-nitro-4-anilino-1:8-dihydroxyanthraquinone used therein, an equal weight of 5-nitro-4-(4'-methylanilino-)1:8-dihydroxyanthraquinone.

A blue dyestuff is obtained having good affinity for, and giving clear blue shades on acetate rayon and polyester fibres, the shades so obtained having excellent fastness to light and to burnt gas fumes.

What I claim is:

1. A process for the manufacture of an anthraquinone dyestuff composition which comprises reacting a 5-nitro-4-anilino-1:8-dihydroxyanthraquinone, in which the phenyl residue of the anilino group is selected from the group consisting of phenyl, lower alkoxy phenyl, lower alkyl phenyl, chlorophenyl and bromophenyl, with more than one molecular proportion of formaldehyde in a medium of sulphuric acid of strength 75% to 90% by weight at a temperature between 10° C. and 40° C.

2. A process as claimed in claim 1 wherein the medium used is sulphuric acid of not less than 80% and not more than 85% strength by weight.

3. A process as claimed in claim 2 wherein the temperature used is not less than 20° C. and not more than 30° C.

4. A process as claimed in claim 1 wherein there is used 5-nitro-4-anilino-1:8-dihydroxyanthraquinone.

5. A process as claimed in claim 1 wherein the formaldehyde used is added as the polymer, paraformaldehyde.

References Cited in the file of this patent

UNITED STATES PATENTS

| | | |
|---|---|---|
| 871,507 | Homolka et al. | Nov. 19, 1907 |
| 2,726,251 | Dickey et al. | Dec. 6, 1955 |

OTHER REFERENCES

Formaldehyde, Walker, second edition, 1953 A. C. S. Monograph Series No. 120, page 195.